2,860,168
PREPARATION OF DIARYL SULFONES

Arthur E. Erickson, Cranford, N. J., assignor to Merck & Co., Inc., Rahway, N. J., a corporation of New Jersey No Drawing. Application January 30, 1957
Serial No. 637,075

3 Claims. (Cl. 260—607)

This invention relates to processes for making diaryl sulfones. More particularly this invention relates to processes for making halogenated diphenyl sulfones.

The halogenated diphenyl sulfones which may be prepared according to the process of the present invention, have the general formula

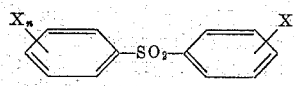

where X is a halogen, i. e., fluorine, chlorine, bromine, or iodine, and $n$ is a positive integer having a value of either 1 or 2. Generally at least one of the halogen atoms in each ring is attached at the para position. Examples of compounds which may be made according to the present invention are 4,4'-dichlorodiphenylsulfone, 4,4'-dibromodiphenylsulfone, and 3,4,3',4'-tetrachlorodiphenylsulfone.

A product of high purity is produced by the process of the present invention. Other advantages of this process are ease of operation and simple equipment requirements.

Prior methods for making these compounds have not been entirely satisfactory as they have generally resulted in low yields of a product which required extensive purification.

An object of the present invention is to prepare halogenated diphenyl sulfones in good yields.

A further object is to prepare halogenated diphenyl sulfones which may be readily recovered in pure form from the reaction mixture.

A still further object is to provide a simple, economical process for preparing halogenated diphenyl sulfones.

These and other objects will be apparent from the specification which follows.

According to the present invention halogenated diphenyl sulfones are made by the reaction of a halobenzene compound with chlorosulfonic acid in a two-stage process. During the first stage the temperature is maintained below 10° C. The second stage of the reaction is carried out at higher temperature, in the range of about 40° to about 60° C. The product, halogenated diphenyl sulfone, is then readily recovered from the reaction mixture.

The halobenzene reagent according to this invention is either a monohalobenzene, i. e., fluorobenzene, chlorobenzene, bromobenzene, iodobenzene, an o-dihalobenzene such as o-dichlorobenzene or o-dibromobenzene, or a m-dihalobenzene such as m-dichlorobenzene or m-dibromobenzene.

In the first stage of the process chlorosulfonic acid and the halobenzene compound are mixed in the molar ratio of about 2:1. When this ratio is maintained, both the halobenzene and the chlorosulfonic acid are completely consumed in the first stage of the reaction. The temperature is maintained below 10° C. for sufficient time for reaction to be substantially complete. This period is generally about one hour or less, although it is understood that the reaction mixture may be maintained at this temperature for longer periods of time, if desired. The preferred reaction temperature is in the range of −30° to +10° C. and best results are obtained when the temperature is maintained in the range of −5° to +5° C. Stirring is desirable, particularly during the initial stage of the reaction to provide good admixture of the reagents.

Additional halobenzene is added to the cold reaction mixture after the first reaction stage is complete. The resulting reaction mixture is then warmed to 40° to 60° C. and maintained at this temperature for the second stage of reaction. The additional amount of halobenzene is such that the molar ratio of chlorosulfonic acid to the total amount of halobenzene is approximately 1:1. It is preferred to operate with a slight excess of chlorosulfonic acid, as for example about 1.1 moles of chlorosulfonic acid per mole of halobenzene. On the other hand, an excess of halobenzene in the second stage of reaction is not deleterious, as excess halobenzene can be removed by steam distillation after the second stage of reaction is completed.

During the second stage of reaction, the product of the first stage reacts with the additional halobenzene to form the halo-substituted diaryl sulfone. This reaction is unexpected in view of the fact that there is no free chlorosulfonic acid in the reaction product mixture. Besides the desired halogenated diphenyl sulfone, various by-products which are readily removed are also formed. These include the corresponding halobenzene sulfonic acid and halobenzenesulfonyl chloride.

The water-insoluble aromatic sulfonyl chlorides produced in the reaction may be readily hydrolyzed at elevated temperature, for example, about 85° C. to the boiling point of the solution, to the corresponding sulfonic acids, which are water-soluble. The product diaryl sulfone may then be separated from the water-soluble by-products by conventional means such as filtration.

As an illustration of a preferred embodiment of this invention, chlorobenzene may be combined with chlorosulfonic acid in a two-stage reaction to form 4,4'-dichlorodiphenylsulfone. Chlorosulfonic acid and chlorobenzene are combined in a molar ratio of about 2:1. This step is carried out at a temperature below 10° C. Both the chlorosulfonic acid and chlorobenzene are consumed. More chlorobenzene is added to the reaction product mixture so that the total quantity of chlorobenzene is slightly less than one mole per mole of chlorosulfonic acid. The temperature is raised to 40° to 60° C., and 4,4'-dichlorodiphenylsulfone is formed. The by-product aromatic sulfonyl chlorides are hydrolyzed at elevated temperature to form the corresponding water-soluble sulfonic acids. The product may then be recovered by filtration.

Other halogenated diphenyl sulfones may be similarly formed. For example, bromobenzene reacts with chlorosulfonic acid in the manner described above to form 4,4'-dibromodiphenylsulfone. Still other products which may be formed are 3,4,3',4'-tetrachlorodiphenylsulfone from o-dichlorobenzene and chlorosulfonic acid, and 2,4,2',4'-tetrachlorodiphenylsulfone from m-dichlorobenzene and chlorosulfonic acid. Still other halogenated diphenyl sulfones may be made according to the present invention as is apparent.

The invention will now be illustrated with respect to specific examples:

Example 1

To 22.4 g. (0.2 mole) of chlorobenzene at a temperature of −5° to +5° C. were added 46.4 g. (0.4 mole) of chlorosulfonic acid with stirring. The addition was made over a period of one hour and the solution was then aged at 0° C. for one additional hour, An additional quantity of 17.9 g. (0.16 mole) of chlorobenzene was then added to the cold solution, and the mixture was gradually warmed to 50° C. The reaction mixture was maintained at 50° C. for one hour, cooled, and then quenched by pouring into 75 ml. of ice water. The resulting aqueous suspension was heated at 90° C. for 30 minutes to hydrolize the by-product, benzenesulfonylchloride. The reaction mixture was then cooled to 20° C. and the sulfone was filtered and washed with water until essentially neutral. Yield, 15.7 g.; M. P., 146°–148° C.

*Example 2*

Following the procedure of Example 1, 0.36 mole of bromobenzene and 0.4 mole of chlorosulfonic acid are combined to produce 4,4'-dibromodiphenylsulfone.

*Example 3*

Following the procedure of Example 1, 0.36 mole of o-dichlorobenzene and 0.4 mole of chlorosulfonic acid are combined to produce 3,4,3',4'-tetrachlorodiphenyl sulfone.

While this invention has been described with reference to specific embodiments thereof, it is understood that the scope of the present invention is limited only by the scope of the appended claims.

What is claimed is:

1. A process for producing halogenated diphenyl sulfones having the general formula

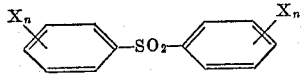

where X is a halogen and $n$ is a positive integer between 1 and 2 inclusive, which comprises combining chlorosulfonic acid with a halobenzene compound selected from the group consisting of the monohalobenzenes, o-dihalobenzenes, and m-dihalobenzenes in the molar ratio of about 2:1, maintaining the temperature below 10° C. during reaction, thereafter adding a further quantity of halobenzene compound such that the molar ratio of chlorosulfonic acid to total halobenzene compound is approximately 1:1, heating the reaction mixture to a temperature in the range of 40° to 60° C., and recovering the resulting halo-substituted diaryl sulfone.

2. A process for producing 4,4'-dichlorodiphenylsulfone which comprises combining chlorosulfonic acid with chlorobenzene in the ratio of approximately 2 moles of chlorosulfonic acid per mole of chlorobenzene at a temperature not in excess of 10° C., thereafter adding a further quantity of chlorobenzene, heating the reaction mixture to a temperature in the range of 40° to 60° C., and recovering the resulting 4,4'-dichlorodiphenylsulfone.

3. A process for producing 4,4'-dichlorodiphenylsulfone which comprises combining chlorosulfonic acid with chlorobenzene in the molar ratio of approximately 2 to 1 at a temperature in the range of −30° to +10° C., maintaining the temperature in this range until the chlorobenzene and chlorosulfonic acid are substantially completely consumed, adding a further quantity of chlorobenzene such that the molar ratio of chlorosulfonic acid to total chlorobenzene is approximately 1:1, heating the reaction mixture to a temperature in the range of 40° to 60° C., and recovering the resulting 4,4'-dichlorodiphenylsulfone.

No references cited.